July 30, 1963 K. F. FRIEDRICH ETAL 3,099,786
CONTROL FOR AN ELECTRIC POWER TRANSLATION SYSTEM
Filed April 13, 1959 2 Sheets-Sheet 2

INVENTORS
Kevin F. Friedrich and
Francis D. Kaiser.
BY
F. E. Browder
ATTORNEY

United States Patent Office 3,099,786
Patented July 30, 1963

3,099,786
CONTROL FOR AN ELECTRIC POWER
TRANSLATION SYSTEM
Kevin F. Friedrich and Francis D. Kaiser, Sharon, Pa., assignors to Westinghouse Electric Corporation, East Pittsburgh, Pa., a corporation of Pennsylvania
Filed Apr. 13, 1959, Ser. No. 805,861
6 Claims. (Cl. 321—20)

This invention relates to electrical control apparatus for controlling the output voltage or other electrical quantity associated with electric power translation systems of the type which includes a plurality of asymmetrically-conducting devices and, more particularly, to regulator systems for maintaining said output voltage or other electrical quantity at substantially a predetermined value.

In certain types of conventional electric power translation systems, such as rectifier circuits, asymmetrically-conducting devices are employed which are of a general type in which the conduction must be controlled by means which are substantially or completely external to or independent of said devices. In other words, asymmetrically-conducting devices of the latter type do not lend themselves to or include means for convenient phase or voltage control as do certain types of vapor electric devices, such as ignitron tubes and other types of mercury-arc rectifiers. Examples of such asymmetrically-conducting devices include a number of known dry-type rectifiers, such as semiconductor diodes of the silicon or germanium type. In order to control the conduction of asymmetrically-conducting devices of the type described, the effective alternating current voltage applied to said devices must be controlled by some means external to said devices. Conventional means which have been employed to control the output voltage or other electrical quantity associated with an electric power translation system employing asymmetrically-conducting devices of the type described include induction regulators, step-type transformer regulating equipment and saturable core reactors. The use of a saturable core reactor in series with associated asymmetrically-conducting devices or with an associated transformer in an electric power translation system, such as a rectifier circuit, offers the advantages of static stepless control of the output voltage of said system, but also has several disadvantages. If the reactor is designed for full voltage control of the translation system, the power factor associated with the reactor is low and the physical size as well as its cost are relatively excessive. On the other hand, if a saturable core reactor is designed for only partial control of the output voltage of an electric power translation system, then the reactor is subject to damage during certain types of abnormal operating conditions, such as faults, when the voltages induced internally in the windings of said reactor become excessive. It is therefore desirable to provide a new and improved electrical control apparatus for controlling the output voltage of an electric power translation system employing asymmetrically-conducting devices of the type described which substantially overcomes the disadvantages of the conventional saturable core reactor control systems just described, particularly in applications where partial range control of the output voltage of a translation system is sufficient or adequate.

It is an object of this invention to provide a new and improved electric power translation system.

It is another object of this invention to provide a new and improved electrical control apparatus for controlling the output voltage of an electric power translation system.

A further object of this invention is to provide a new and improved electrical control apparatus for controlling the output voltage of an electric power translation system which includes a plurality of asymmetrically-conducting devices of the general type in which the conduction of said devices must be controlled by means which are completely external to said devices.

A still further object of this invention is to provide a new and improved regulator system for maintaining the output voltage of an electric power translation system at substantially a predetermined value.

A more specific object of this invention is to provide an electrical control apparatus for controlling the output voltage of an electric power translation system over a partial range.

A final object of this invention is to provide an electrical control apparatus for controlling the commutating reactance in an electric power translation system to thereby control the output voltage of said translation system.

Other objects of the invention will in part be obvious, and will in part appear hereinafter.

For a fuller understanding of the nature and the objects of the invention reference should be had to the following detailed description taken in connection with the accompanying drawings, in which.

Figure 1:
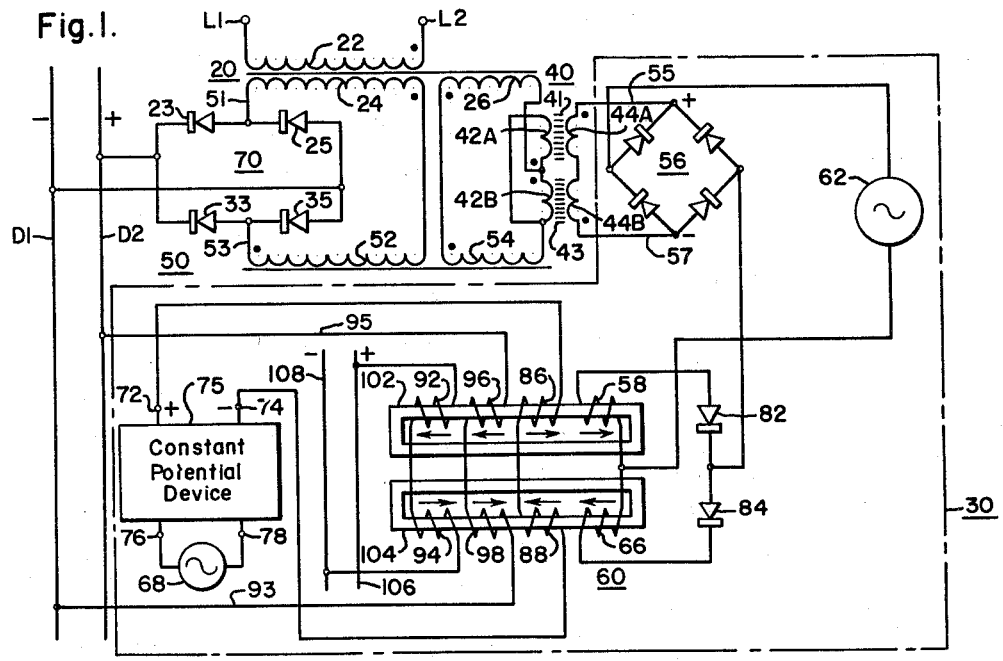
FIGURE 1 is a schematic diagram of an electric power translation system illustrating a first embodiment of the invention.

Referring now to the drawings and FIG. 1 in particular, there is shown in general, an electric power translation system illustrating a first embodiment of the invention. More specifically, there is illustrated an electric power translation system of the type in which power is taken from a single phase alternating current power supply system, including the power leads L1 and L2, and is transmitted through a plurality of asymmetrically-conducting devices to a unidirectional current circuit having power leads D1 and D2 to which may be connected a load (not shown). The invention will be described as if the power is transferred from the single phase alternating current power leads L1 and L2 to the unidirectional current or direct-current power leads D1 and D2, but it is to be understood that by the use of well known inverter control connections, the direction of power flow could be reversed.

The electric power translation system, more specifically the rectifier system shown in FIG. 1, comprises a first or main rectifier transformer means 20, a second or series transformer means 50, a full-wave, bridge-type rectifier circuit 70 and a saturable core reactor means 40. In order to maintain the output voltage of the translation system shown in FIG. 1 which appears at the unidirectional current power leads D1 and D2 at substantially a predetermined value, a regulator system 30 is connected in circuit relation between the saturable core reactor 40 and said unidirectional current power leads.

In particular, the first transformer means 20 comprises a first or primary winding 22 connected across the alternating current power leads at L1 and L2, a second or secondary winding 24 and a third or tertiary winding 26, said second and third windings being disposed in inductive relation with said first winding. The second transformer means 50 comprises a first or primary winding 54 and a second or secondary winding 52, said secondary winding of the second transformer means 50 being connected in series circuit relationship with the second winding 24 of the first transformer means 20. The sum of the voltages across the second winding 24 of the first transformer means 20 and across the second winding 52 of the second transformer means 50 is applied at the input of the full-wave rectifier circuit 70 at the rectifier leads 51 and 53. The voltage across the second winding 52 of the second transformer 50 is preferably arranged to be additive or boosting with respect to the voltage across the second winding 24 of the first transformer means 20, but it is to be understood that in a particular application that the former voltage may be arranged to be opposing or bucking with respect to the latter voltage.

In order to permit variation or control of the portion of the voltage across the third winding 26 of the first transformer means 20 which is applied to the primary winding 54 of the second transformer means 50, the saturable core reactor 40 is connected in circuit relation between the third winding 26 of the first transformer means 20 and the primary winding 54 of the second transformer means 50. In particular, the saturable core reactor 40 comprises the alternating current or load windings 42A and 42B, the direct current or control windings 44A and 44B and the saturable magnetic cores 41 and 43 on which are inductively disposed the windings 42A and 44A and 42B and 44B, respectively. The load windings 42A and 42B of the saturable core reactor 40 are connected in parallel circuit relation with respect to each other and in series circuit relation with respect to the third winding 26 of the first transformer means 20 and with respect to the primary winding 54 of the second transformer means 50. The control or bias windings 44A and 44B of the reactor 40 are connected in series circuit relation with respect to each other, the series circuit being connected across the output of the regulator system 30 at the conductors 55 and 57. As shown in FIG. 1, the relative polarities of the voltages induced in the control windings 44A and 44B of the reactor 40 by the alternating current which flows in the load windings 42A and 42B, respectively, are arranged so that said induced voltages are opposing and substantially cancel each other out to thereby prevent interference with the operation of the regulator system 30 by said induced voltages. The saturable core reactor 40 is preferably of the general type which is described in detail in U.S. Patent 2,374,059, filed by E. C. Wentz and assigned to the same assignee as the present application.

In general, the full-wave, bridge-type rectifier circuit 70 is connected in circuit relation between the unidirectional current power leads D1 and D2 and the first and second transformer means 20 and 50, respectively, to be responsive to the vector sum of the effective alternating current voltages across the second winding 24 of the first transformer means 50 and the second winding 52 of the second transformer means 50. More specifically, the rectifier circuit 70 comprises a plurality of asymmetrically-conducting devices, more specifically semiconductor diodes, connected in two parallel branches which together form a conventional, full wave rectifier circuit. The first branch includes the semiconductor diodes 23 and 25 connected in series circuit relationship between the positive bus conductor D2 and the negative bus conductor D1. The other parallel branch includes the semiconductor diodes 33 and 35 connected in series circuit relationship between the positive bus conductor D2 and the negative bus conductor D1. As previously mentioned, the input of the rectifier circuit 70 is responsive to the sum of the voltage across the second winding 24 of the first transformer means 20 and across the second winding 52 of the second transformer means 50, the left end of the winding 24 being connected to the bridging point between the diodes 23 and 25 as indicated at the rectifier lead 51 and the left end of the winding 52 being connected to the bridging point between the diodes 33 and 35 as indicated at the rectifier lead 53. The semiconductor diodes 23, 25, 33 and 35 are asymmetrically-conducting devices of a general type in which the conduction is controlled by means which are completely external to said devices. In other words, the conduction of said diode depends only on the sum of the effective voltages across the second winding 24 of the first transformer means 20 and across the second winding 52 of the second transformer 50 and of course, on the nature of whatever load (not shown) is connected at unidirectional current power leads D1 and D2.

In the translation system shown in FIG. 1 when an alternating current voltage is applied at the line conductors L1 and L2 across the first winding 22 of the first transformer means 20, the total voltage applied to the full-wave rectifier circuit 70 at the rectifier leads 51 and 53, therefore, includes two voltage components. The first voltage component of said total voltage appears across the second winding 24 of the first transformer means 20. The second voltage component appears across the second winding 52 of the second transformer means 50, as previously mentioned. The second voltage component across the second winding 52 varies with the voltage across the primary winding 54 of the second transformer means 50 which in turn varies with the effective voltage drop across the saturable core reactor 40, since the voltage across said primary winding is the effective voltage difference between the voltage across the tertiary winding 26 of the first transformer means 20 and the voltage across said saturable core reactor. The effective voltage drop across the saturable core reactor 40 is controlled by or varies with the control signal or voltage applied to the control or bias windings 44A and 44B of said reactor at the output leads 55 and 57 of the regulator system 30, which determines the effective reactance of said reactor, and also varies with the load current being drawn from the unidirectional current power leads D1 and D2 at the output of the translation system shown in FIG. 1. Since the voltage across the second winding 52 of the second transformer means 50 varies with the control signal or voltage applied to the saturable core reactor 40 at the output leads 55 and 57 of the regulator system 30, the output voltage of the translation system shown in FIG. 1 which appears at the unidirectional current power leads D1 and D2 also varies with said control signal or voltage from the regulator system 30. It is to be understood that in a particular application the control signal or voltage applied to the saturable core reactor 40 at the leads 55 and 57 may be obtained from any source of unidirectional current signal or voltage rather than the regulator system 30, as illustrated in FIG. 1, in order to vary the output voltage of the translation system which appears at the unidirectional current power leads D1 and D2 in whatever type of control is desired.

In effect, the tertiary winding 26 of the first transformer means 20, the saturable core reactor 40 and the second transformer means 50 taken together comprise means for varying the effective commutating reactance of the translation system shown in FIG. 1, which is the reactance which effectively opposes the transfer of current between rectifying elements of a commutating group which in this case is the full-wave rectifier circuit 70, which includes the diodes 23, 25, 33 and 35. The effective commutating reactance of the translation system shown in FIG. 1, therefore, varies with the control signal or voltage applied to the saturable core reactor 40 at the leads 55 and 57 to thereby vary the output voltage of said translation system which appears at the unidirectional current output leads D1 and D2. It is important to note that the effective alternating current voltage applied to the load windings of the saturable core reactor 40 may be controlled by selection of the ratio of turns of the windings of the first transformer means 20 and the second transformer means 50. The equivalent kva. rating of the saturable core reactor 40, the tertiary winding 26 of the first transformer means 20 and of the second transformer means 50 all vary with the degree of partial range control over which the output voltage of the translation system shown in FIG. 1, which appears at the unidirectional current power leads D1 and D2, must be controlled by the control signal or voltage applied to the saturable core reactor 40 at the leads 55 and 57.

As illustrated, the regulator system 30 is connected in circuit relation between the unidirectional current power leads D1 and D2 and the saturable core reactor 40 to provide a control signal which varies with the output voltage of the translation system shown in FIG. 1, as it appears at the power leads D1 and D2, and which is applied to the saturable core reactor 40 to thereby maintain said output voltage at substantially a predetermined value. In general, the regulator system 30 comprises a single-ended magnetic amplifier 60 which is interconnected between the unidirectional current power leads D1 and D2 and the control or bias windings 44A and 44B of the saturable core reactor 40.

In particular, the magnetic amplifier 60 comprises two magnetic core members 102 and 104. In this instance, the load windings 58 and 66 are disposed in inductive relationship with the magnetic core members 102 and 104, respectively. As is customary, self-saturation for the magnetic amplifier 60 is obtained by connecting in series circuit relationship with the load windings 58 and 66, the self-saturating rectifiers 82 and 84, respectively. In order to form a doubler-circuit in the magnetic amplifier 60, the series circuit including the load winding 58 and the self-saturating rectifier 82 is connected in parallel circuit relationship with the series circuit which includes the load winding 66 and the self-saturating rectifier 84. Energy for the load windings 58 and 66 is received from a suitable source of alternating current 62. It is to be understood that the energy for the load windings 58 and 66 in a particular application may be obtained directly from the line conductors L1 and L2 or through an interposing transformer (not shown) connected to said line conductors. As illustrated, a full-wave dry-type load rectifier 56 is interconnected with the hereinbefore described parallel circuit of the magnetic amplifier 60 in order to produce a direct current or unidirectional current output of said magnetic amplifier at the output leads 55 and 57. As previously indicated, the control or bias windings 44A and 44B of the saturable core reactor 40 are connected in series between the output leads 55 and 57 to be responsive to the output signal or voltage of the magnetic amplifier 60 as it appears across the output terminals of the rectifier 56.

For the purpose of biasing the magnetic amplifier 60 by a predetermined amount, the bias windings 92 and 94 are disposed in inductive relationship with the magnetic core members 102 and 104, respectively. In particular, the bias windings 92 and 94 are connected in series circuit relationship with one another, the series circuit being connected to conductors 106 and 108 which have applied thereto a substantially constant direct current voltage. In operation, the current flow through the bias windings 92 and 94 produces a magnetomotive force with respect to their respective magnetic core members that opposes the magnetomotive force produced by the current flow through the load windings 58 and 66, respectively.

In order to obtain a reference point from which to operate in the magnetic amplifier 60, the reference windings 86 and 88 are disposed in inductive relationship with the magnetic core members 102 and 104, respectively. The reference windings 86 and 88 are so disposed on their respective magnetic core members 102 and 104, respectively that the current flow through the reference windings 86 and 88 produces a magnetomotive force that opposes the magnetomotive force produced by the respective bias windings 92 and 94, respectively. As illustrated, the reference windings 86 and 88 are connected in series circuit relationship with one another, the series circuit being connected to the output terminals 72 and 74 of a constant potential device 75. In order that the current flow through the reference windings 86 and 88 remains substantially constant, the constant potential device 75 produces at its output a substantially constant unidirectional current output irrespective of the magnitude of the output voltage of the alternating current source 68 to which the constant potential device 75 is connected at its input terminals 76 and 78. It is to be undersood that in a particular application the input teminals 76 and 78 of the constant potential device 75 may be connected to the line conductors L1 and L2, either directly or through an interposing transformer (not shown).

The control windings 96 and 98 are disposed in inductive relationship with the magnetic core members 102 and 104, respectively. The control windings 96 and 98 are connected in series circuit relationship with one another, the series circuit being connected across the unidirectional current power leads D1 and D2 through the conductors 95 and 93, respectively, to be responsive to the output voltage of the translation system shown in FIG. 1. The control windings 96 and 98 are so disposed on their respective magnetic core members 102 and 104 that when current flows therethrough a magnetomotive force is produced in the respective magnetic core members that opposes the magnetomotive force produced by the current flow through the respective reference windings 86 and 88. The output voltage of the translation system at the power leads D1 and D2 may be arranged to be at substantially its regulated value when the magnetomotive forces that are produced by the current flow through the control windings 96 and 98 are equal to the respective magnetomotive forces produced by the current flow through the reference windings 86 and 88, respectively.

In the operation of the regulator system 30 when the output voltage of the translation system shown in FIG. 1 at the power leads D1 and D2 increases to a value above its regulated value, the current flow through the control windings 96 and 98 increases to thereby decrease the output signal or current from the magnetic amplifier 60 at the output leads 55 and 57. Such an action decreases the current flow through the control or bias windings 44A and 44B of the saturable core reactor 40 and increases the effective reactance of the associated alternating current or load windings 42A and 42B, respectively, of said reactor. An increase in the effective reactance of the saturable core reactor 40 increases the corresponding effective voltage drop across said reactor and decreases the effective voltage across the primary winding 54 of the second transformer means 50 to thereby decrease the corresponding voltage across the second winding 52 of said second transformer means. A decrease in the voltage across the second winding 52 of the second transformer means 50 decreases the total voltage applied to the rectifier leads 51 and 53 of the rectifier circuit 70 to thereby decrease the output voltage of the translation system shown in FIG. 1 at the power leads D1 and D2 to the desired regulated value.

On the other hand, a decrease in the output voltage of the translation system shown in FIG. 1 at the power leads D1 and D2 to a value below its regulated value decreases the magnitude of the current flow through the control windings 96 and 98 of the magnetic amplifier 60. A decrease in the current flow through the control windings 96 and 98 increases the output signal or current from the magnetic amplifier 60 at the output leads 55 and 57 and increases current flow through the control or bias windings 44A and 44B of the saturable core reactor 40. Such an action decreases the effective reactance of the associated alternating current or load windings 42A and 42B, respectively, of the reactor 40 and the corresponding voltage drop across said reactor. A decrease in the voltage drop across the reactor 40 increases the voltage across the primary winding 54 of the second transformer means 50 and the corresponding voltage across the second winding 52 of said second transformer means. An increase in the voltage across the second winding 52 of the second transformer means 50 increases the total voltage applied to the full-wave rectifier circuit 70 and increases the output voltage of the translation system shown in FIG. 1 at the power leads D1 and D2 to its regulated value.

Figure 4:
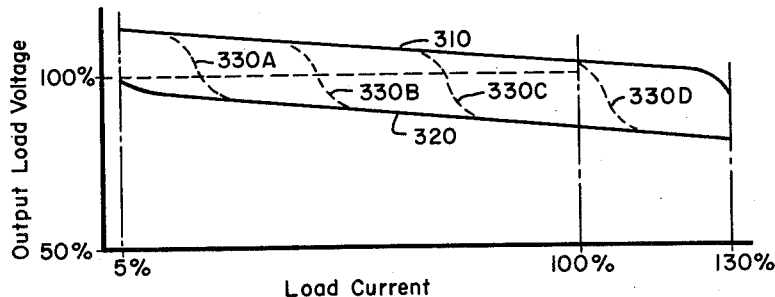
FIG. 4 is a set of curves illustrating the operation of the translation systems shown in FIGS. 1, 2 and 3.
Figure 6:
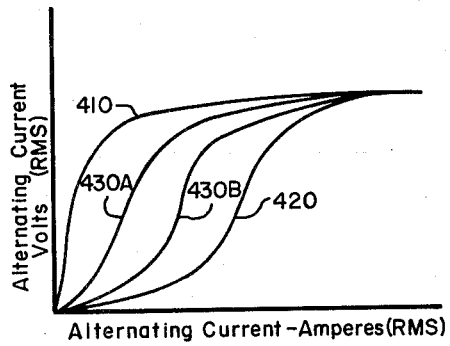
FIG. 6 illustrates typical alternating current saturation curves for a saturable core reactor.
Figure 5:
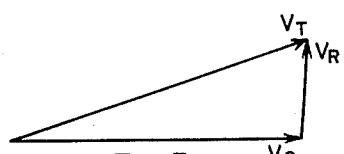
FIG. 5 is a simplified vector diagram explanatory of the operation of the translation systems shown in FIGS. 1, 2 and 3.

The operation of the regulator system 30 and its effect on the operation of the translation system shown in FIG. 1 can more clearly be understood by referring to FIGS. 4, 5 and 6. Referring to FIG. 5, there is illustrated a simplified vector diagram which neglects deviations of the associated voltage wave forms from purely sinusoidal wave forms. The voltage vector $V_T$ represents the voltage across the tertiary winding 26 of the first transformer means 20 when a predetermined alternating current voltage is applied across the first winding 22 of said first transformer means at the line conductors L1 and L2 and is substantially independent of the control signal or current applied to the saturable core reactor 40 by the regulator system 30. The voltage vector $V_R$ represents the effective alternating current voltage drop across the load windings 42A and 42B of the saturable core reactor 40 which varies with the control signal or current applied to the associated control or bias windings 44A and 44B, respectively, of said reactor and with the effective alternating current flowing through said load windings of said reactor. The voltage vector $V_S$ represents the effective alternating current voltage across the primary winding 54 of the second transformer means 50 and is the effective voltage difference between the effective alternating current voltage across the tertiary winding 26 of the first transformer 20, as indicated at $V_T$, and the effective voltage drop across the alternating current or load windings 42A and 42B of the reactor 40, as indicated at $V_R$. As just explained, the effective voltage drop across the saturable reactor 40, as indicated at $V_R$, varies with the control signal applied to the control windings 44A and 44B of said reactor from the regulator system 30 in response to changes in the output voltage of the translation system shown in FIG. 1 at the power leads D1 and D2 to thereby vary the voltage across the primary winding 54 of the second transformer means 50, as indicated at $V_S$, and the corresponding voltage across the second winding 52 of said second transformer means 50 to thereby maintain the output voltage of the translation system shown in FIG. 1 at substantially a predetermined value.

Referring to FIG. 6, there are illustrated typical alternating current saturation curves for the saturable core reactor 40 of the type disclosed in U.S. Patent 2,374,059 previously mentioned. In particular, the curves plotted in FIG. 6 show the effective alternating current voltage drop across the alternating current or load windings 42A and 42B of the saturable reactor 40 as a function of the effective alternating current flow through said load windings for different values of control or bias current applied to the associated control or bias windings 44A and 44B, respectively, of said reactor. The curves 410 and 420 represent a negligible value and the maximum rated value, respectively, of bias or control current applied to the control windings 44A and 44B of the reactor 40, while the curves 430A and 430B were plotted for intermediate values of bias or control current applied to said control windings, the control current associated with the curve 430B being greater than the control current associated with the curve 430A. It is to be noted from the curves 430A, 430B and 420 which represent increasing values of bias or control current applied to the control windings of the saturable reactor 40 that, as the alternating current flow through the reactor 40 increases, the corresponding effective alternating current voltage drop across said reactor increases rather slowly initially, then increases steeply or sharply as said alternating current flow increases still further and finally increases to a maximum value as the magnetic cores 41 and 43 included with the reactor 40 saturate. In summary, the effective alternating current voltage drop across the saturable reactor 40 varies with the control signal or current applied to the control windings of said reactor from the regulator system 30 or any other source of control signal or current and with the alternating current flow through the alternating current or load windings of said reactor between a negligible value and a maximum value which depends on the operating characteristics of said reactor, as shown in FIG. 6.

Referring now to FIG. 4, there is illustrated a family of regulation curves associated with the translation system shown in FIG. 1 for different values of control or bias current applied to the control windings 44A and 44B of the saturable reactor 40. In FIG. 4, the output load voltage associated with the translation system shown in FIG. 1, which appears at the unidirectional current power leads D1 and D2, is plotted as a function of the load current being drawn by whatever load (not shown) which is connected at said unidirectional power leads for different values of bias or control current applied to the control or bias windings of the saturable reactor 40. In particular, the curves 310 and 320 represent the regulation curves associated with a maximum rated value of bias or control current and with a negligible value of bias or control current, respectively, applied to the control windings 44A and 44B of the saturable reactor 40, while the curves 330A through 330D represent the regulation curves associated with increasing intermediate values of said bias or control current. It is to be noted from each of the regulation curves shown in FIG. 4, except for the curve 320, that the output voltage of the translation system shown in FIG. 1 decreases rather slowly during the first portion of each of said curves at lower values of load current. The first portion of each of said curves corresponds to the fairly flat lower portion of the associated alternating current saturation curves of the saturable reactor 40 shown in FIG. 6, when the effective alternating current voltage drop across said reactor is at a relatively low value. During the first portion of each of said curves, the effect of the saturable reactor 40 on the effective commutating reactance of the translation system shown in FIG. 1 may then be regarded as relatively negligible. Each of the regulation curves shown in FIG. 4 includes a second or transition portion in which the output voltage of the translation system decreases rather sharply with further increases in load current. The transition portion of each of said regulation curves corresponds to the rather steep portion of the associated alternating current saturation curves associated with the reactor 40, as shown in FIG. 6. During the transition period or portion of each of said regulation curves, the effective alternating current voltage or voltage absorbed across the saturable reactor 40 increases rather sharply from a relatively low value to substantially a maximum value to thereby cause a corresponding decrease in the output voltage of the translation system shown in FIG. 1. During the transition portion of each of said regulation curves, the effective commutating reactance of the translation system shown in FIG. 1 increases from substantially a minimum value to substantially a maximum value depending on the operating characteristics of the saturable reactor 40. During the final or third portion of each of said regulation curves the output voltage of the translation system again decreases rather slowly with further increases in load current, as shown in FIG. 4, indicating that the maximum voltage drop or voltage absorbed by the saturable reactor 40 has been reached. The latter portions of said regulation curves correspond to the saturated portions of the curves associated with the saturable reactor 40, as shown in FIG. 6. In summary, the regulator system 30 can be arranged to provide a variable control signal or current to the control windings of the saturable reactor 40 to maintain at substantially 100% of the rated regulated value, the output voltage of the translation system shown in FIG. 1 over a load current range of approximately 5% to 100% of the rated output load current of said system, as shown in FIG. 4. The regulator system 30 accomplishes the latter result by varying the effective reactance of the saturable reactor 40 and the corresponding overall effective commutating reactance of the translation system shown in FIG. 1 in response to changes in the output voltage of said translation system.

Figure 2:
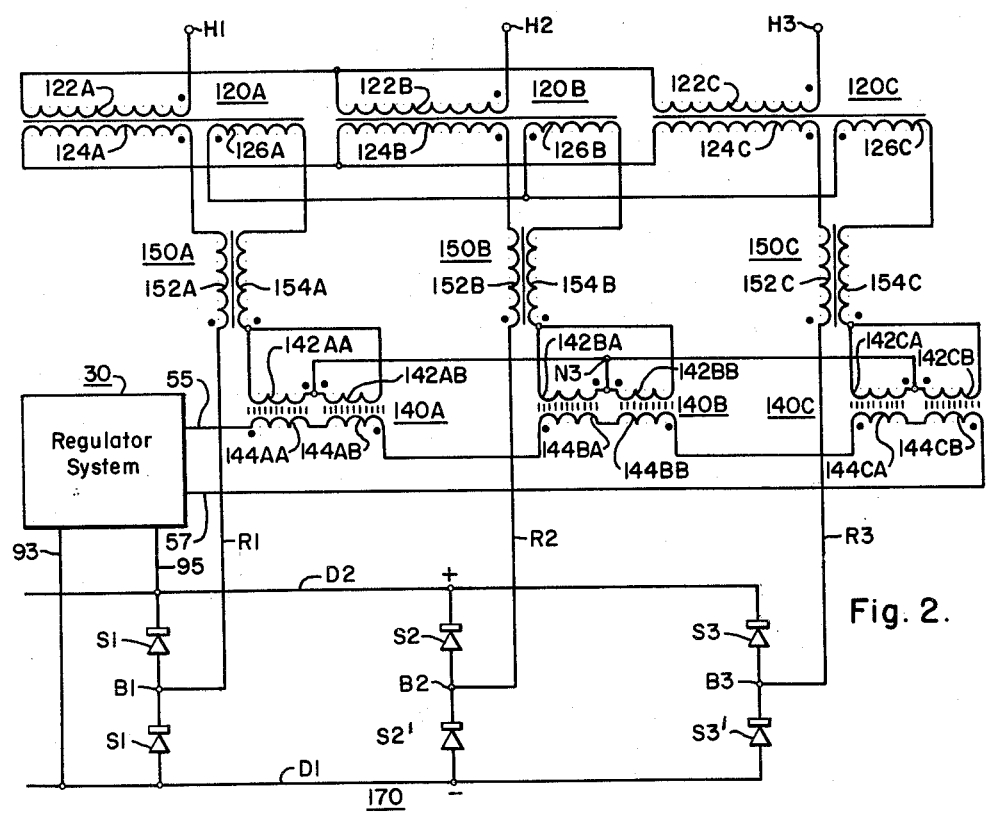
FIG. 2 is a schematic diagram of an electric power translation system illustrating a second embodiment of the invention.

Referring now to FIG. 2 there is illustrated a second embodiment of the invention in which the principles of the invention are applied to a polyphase electric power translation system, more specifically, to a three-phase rectifier circuit. Similarly, to the translation system shown in FIG. 1, in the translation system shown in FIG. 2, power is taken from a three-phase alternating current power supply system including the power leads H1, H2 and H3 and is transmitted through a plurality of asymmetrically-conducting devices to a unidirectional current circuit having power leads D1 and D2 to which may be connected a load (not shown).

The electric power translation system shown in FIG. 2, more specifically the rectifier system, comprises a plurality of first transformer means, a plurality of second transformer means, a plurality of saturable core reactors and a plurality of asymmetrically-conducting devices connected in circuit relation to provide a unidirectional current output based on six-phase rectifier operation.

In particular, the first transformer means 120A, 120B and 120C include the first windings 122A, 122B and 122C, respectively, the second windings 124A, 124B and 124C, respectively, and the third or tertiary windings 126A, 126B and 126C, respectively. The first windings 122A, 122B and 122C of said first transformer means are connected in a Y arrangement to the alternating current power leads H1, H2 and H3, respectively. The second transformer means 150A, 150B and 150C include the first or primary windings 154A, 154B and 154C, respectively, and the second or secondary windings 152A, 152B and 152C, respectively. The second windings 124A, 124B and 124C of the first transformer means 120A, 120B and 120C, respectively, are also connected in a Y arrangement and in series circuit relationship with the associated secondary windings 152A, 152B and 152C, respectively, of the second transformer means 150A, 150B and 150C, respectively, the series circuits being connected to the rectifier leads R1, R2 and R3, respectively, to provide six rectifier phase voltages to the full-wave, bridge-type rectifier circuit 170 shown in FIG. 2. The tertiary windings 126A, 126B and 126C of the first transformer means 120A, 120B and 120C, respectively, are also connected in a Y arrangement and in series circuit relationship with the primary windings 154A, 154B and 154C of the second transformer means 150A, 150B and 150C, respectively. In order to vary the portion of the alternating current voltages across the tertiary windings 126A, 126B and 126C of the first transformer means 120A, 120B and 120C, respectively, which are applied to the primary windings 154A, 154B and 154C of the second transformer means 150A, 150B and 150C, respectively, the saturable core reactors 140A, 140B and 140C, respectively are included in the translation system shown in FIG. 2.

In particular, the saturable core reactors 140A, 140B and 140C include the alternating current or load windings 142AA and 142AB, 142BA and 142BB, and 142CA and 142CB, respectively, and the bias or control windings 144AA and 144AB, 144BA and 144BB, and 144CA and 144CD, respectively, similarly to the saturable core reactor 40 included in the translation system shown in FIG. 1. The alternating current or load windings of each of the saturable reactors 140A, 140B and 140C are connected in parallel circuit relationship with one another and in series circuit relationship with the associated primary windings 154A, 154B and 154C of the second transformer means 150A, 150B and 150C, respectively. The alternating current or load windings of the saturable reactors 140A, 140B and 140C are also connected in a Y arrangement to a common neutral terminal N3. The control or bias windings of each of the saturable reactors 140A, 140B and 140C are connected in series circuit relationship with one another and with the control windings of the other saturable reactors, the overall series circuit being connected across the output leads 55 and 57 of the regulator system 30 shown in FIG. 2. The regulator system 30 shown in FIG. 2 is identical to the regulator system 30 shown in FIG. 1, the output control signal or current of the regulator system 30 at the output leads 55 and 57 varying with the output voltage of the translation system shown in FIG. 2, since the input of the regulator system 30 is connected to the unidirectional current power leads D1 and D2 through the conductors 93 and 95, respectively, shown in FIG. 2.

The full-wave rectifier circuit 170, similarly to the rectifier circuit 70 shown in FIG. 1, comprises a plurality of asymmetrically-conducting devices, more specifically, the semiconductor diodes S1 through S3 and S1' through S3'. The semiconductor diodes S1 through S3 are connected between the bridging terminals B1 through B3, respectively, and the positive unidirectional current power lead D2. The semiconductor diodes S1' through S3' are connected between the bridging terminals B1 through B3, respectively, and the negative unidirectional current power lead D1. The semiconductor diodes S1 through S3 and S1' through S3' are similar to the semiconductor diodes 23, 25, 33 and 35, which are shown in FIG. 1, and are of the same type as previously described in greater detail. The translation system shown in FIG. 2 is of a general type which may be described as a Y, six-phase, Y, double-way rectifier circuit while the translation system shown in FIG. 1 is of a general type which may be described as a diametric, double-way rectifier circuit.

In general, the operation of the translation system shown in FIG. 2 is similar to the operation of the translation system shown in FIG. 1 except that the output voltage of the translation system shown in FIG. 2 is obtained by means of six-phase rectifier operation rather than by full-wave single-phase operation as in the translation system shown in FIG. 1. It is to be understood that the first transformer means 120A, 120B and 120C or the second transformer means 150A, 150B and 150C may be combined in three-phase transformer structures in particular applications. Similarly, it is to be understood that the saturable reactors 140A, 140B and 140C may be combined in a three-phase reactor structure.

More specifically, in the operation of the translation system, shown in FIG. 2 each of the total voltages applied at the rectifier leads R1, R2 and R3 at the input of the rectifier circuit 170 comprises two components. The first component of the total voltage applied at each of the rectifier leads R1, R2 and R3 is obtained across the associated second windings 124A, 124B and 124C, respectively, of the first transformer means 120A, 120B and 120C, respectively. The second voltage component of the total voltage applied at each of the rectifier leads R1, R2 and R3 is obtained across the second windings 152A, 152B and 152C of the second transformer means 150A, 150B and 150C, respectively, and is preferably arranged to be additive or aiding with respect to the associated first voltage component at each of said respective rectifier leads. The second voltage component applied at each of the rectifier leads R1, R2 and R3 varies with the corresponding voltage across each of the primary windings 154A, 154B and 154C of the second transformer means 150A, 150B and 150C, respectively. The voltage across each of the latter primary windings varies with the voltage drop across the associated saturable reactors 140A, 140B and 140C, respectively, which in turn depends on the control or bias current applied to each of the control windings of said reactors by the regulator system 30 since the total voltage across each of said primary windings and the associated saturable reactors is obtained from across the associated tertiary windings 126A, 126B and 126C of the first transformer means 120A, 120B and 120C, respectively. The detailed operation of each of the phases of the translation system shown in FIG. 2 is similar to the detailed operation of the translation system shown in FIG. 1, as previously described. Similarly to the translation system shown in FIG. 1, a control signal or current may be applied at the leads 55 and 57 from any source of control signal or current in order to vary the output voltage of the translation system shown in FIG. 2 rather than obtaining a control signal or current from the regulator system 30 shown in FIG. 2 in order to maintain said output voltage at substantially a predetermined value.

Figure 3:
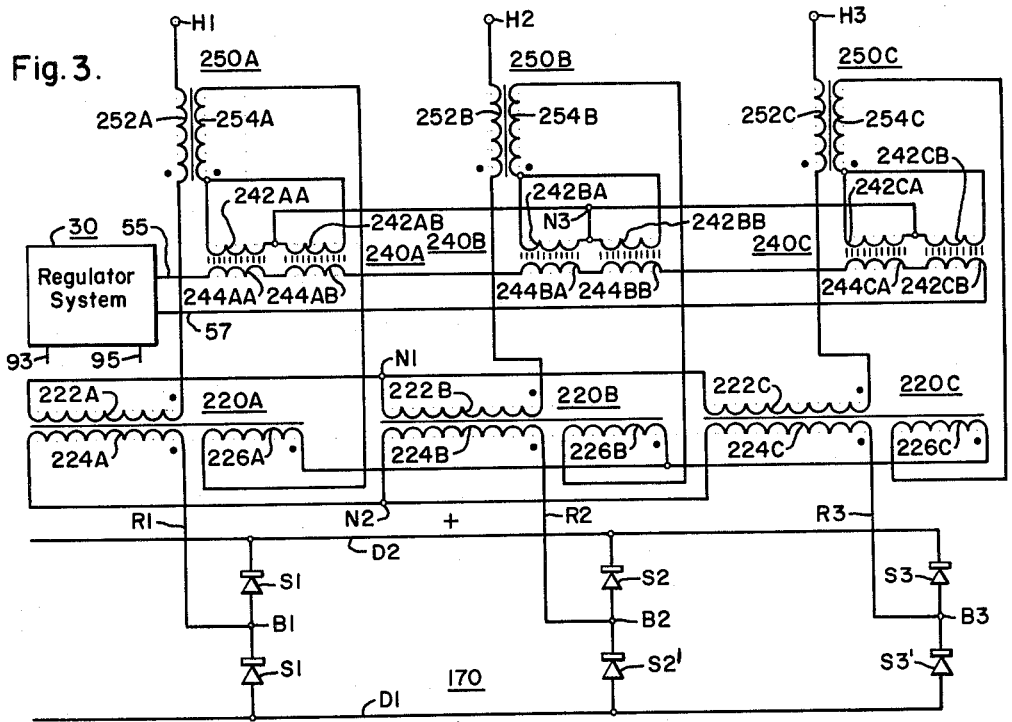
FIG. 3 is a schematic diagram illustrating a third embodiment of the invention.

Referring now to FIG. 3, there is shown an electric power translation system illustrating a third embodiment of the invention. In general, the translation system shown in FIG. 3 is similar to the translation system shown in FIG. 2 except that the secondary windings of the second transformer means included in the former translation system are connected in series circuit relationship with the first winding of the associated first transformer means rather than being connected in series circuit relationship with the second winding of the associated first transformer means as provided in the latter translation system. In certain applications, the use of the translation system shown in FIG. 2 would require excessive current ratings for the saturable reactors and the associated second transformer means shown in FIG. 2. The translation system shown in FIG. 3 is particularly adapted for such applications since it effectively reduces the current rating requirements for the saturable core reactors and the associated second transformer means included in a translation system of the type described. Similarly to the translation system shown in FIG. 2, the translation system, more specifically, the rectifier system shown in FIG. 3 comprises a plurality of first transformer means, a plurality of second transformer means, a plurality of saturable core reactors and a plurality of asymmetrically-conducting devices connected in circuit relation to provide a unidirectional current output based on six-phase rectifier operation at the unidirectional current power leads D1 and D2.

In particular, the first transformer means 220A, 220B and 220C include the first windings 222A, 222B and 222C, respectively, the second windings 224A, 224B and 224C, respectively, and the third or tertiary windings 226A, 226B and 226C, respectively. The second transformer means 250A, 250B and 250C include the first or primary windings 254A, 254B and 254C, respectively, and the second or secondary windings 252A, 252B and 252C, respectively. The first windings 222A, 222B and 222C of the first transformer means 220A, 220B and 220C, respectively, are each connected in series circuit relationship with the associated second windings 252A, 252B and 252C of the second transformer means 250A, 250B and 250C, respectively, between the alternating current power conductors H1, H2 and H3, respectively, and the common neutral terminal N1 in a Y arrangement. The second windings 224A, 224B and 224C of the first transformer means 220A, 220B and 220C, respectively, are connected in a Y arrangement between the common neutral terminal N2 and the rectifier leads R1, R2 and R3, respectively, which are connected in turn to the bridge terminals B1, B2 and B3, respectively, of the full-wave rectifier circuit 170 similarly to the translation system shown in FIG. 2. The primary windings 254A, 254B and 254C of the second transformer means 250A, 250B and 250C, respectively, are connected in series circuit relationship with the associated tertiary windings 226A, 226B and 226C of the first transformer means 220A, 220B and 220C, respectively. In order to vary the portion of the voltages across said tertiary windings, which are applied to the associated primary windings, the saturable core reactors 240A, 240B and 240C are provided.

Similarly to the translation system shown in FIG. 2, the alternating current or load windings 242AA and 242AB, 242BA and 242BB, and 242CA and 242CB of the saturable reactors 240A, 240B and 240C, respectively, are connected in series circuit relationship with the associated primary windings 254A, 254B and 254C, respectively, and in series circuit relationship with the associated tertiary windings 226A, 226B and 226C, respectively, the overall series circuit being connected in a Y arrangement to the neutral terminal N3. The control or bias windings 244AA and 244AB, 244BA and 244BB, and 244CA and 244CB of the saturable reactors 240A, 240B and 240C, respectively, are connected in series circuit relationship with one another and with the control windings of the other reactors, the overall series circuit being connected at the output leads 55 and 57 of the regulator system 30 shown in FIG. 3. Similarly to the translation system shown in FIG. 2, the regulator system 30 applies an output control signal or current to said control windings of said reactors which is responsive to the output voltage of the translation system shown in FIG. 3, the input of said regulator system being connected to the unidirectional current power leads D1 and D2 through the conductors 93 and 95, respectively.

The operation of the translation system shown in FIG. 3 is similar to the operation of the translation system shown in FIG. 2, as previously described. The total voltage applied to the input of the rectifier circuit 170 shown in FIG. 3 at the rectifier leads R1, R2 and R3 varies with two voltage components. The first voltage component is the voltage applied at each of the alternating current power conductors H1, H2 and H3. The second voltage component is provided across the second windings 252A, 252B and 252C of the second transformer means 250A, 250B and 250C, respectively. The second voltage component across each of said second windings varies with the control signal or current applied to the control windings of the saturable reactors 240A, 240B and 240C, respectively, as previously discussed in connection with the translation system shown in FIG. 2. The voltage across the second windings 224A, 224B and 224C of the first transformer means 220A, 220B and 220C, respectively, varies with the vector sum of the effective voltage components just mentioned and is applied directly to the input of the rectifier circuit 170 at the rectifier leads R1, R2 and R3, respectively. The detailed operation of each of the phases of the translation system shown in FIG. 3 is otherwise the same as previously described for the translation system shown in FIG. 1. It is to be noted that the second voltage components across each of the secondary windings of the second transformer means 250A, 250B and 250C are preferably arranged to be additive or aiding with respect to the associated first voltage components applied at the alternating current power conductors H1, H2 and H3, respectively, rather than bucking or opposing.

The translation system shown in FIG. 3 has a particular advantage in applications where special connections are to be employed in the second windings of the first transformer means, such as zig-zag connections, since it eliminates certain phase problems. The translation system shown in FIG. 3 also has an advantage since it avoids splitting of the windings of the second transformer means in applications where the windings of the associated first transformer means are split for certain reasons. It is to be understood that the translation system shown in FIG. 1 may be modified similarly to the translation system shown in FIG. 3 with the second winding of the second transformer means shown in FIG. 1 connected in series circuit relationship with the first winding of the associated first transformer means shown in FIG. 1 rather than being connected in series circuit relationship with the second winding of the first transformer means as illustrated in FIG. 1.

It is to be understood that a fourth embodiment of the invention may be provided in which the tertiary winding included in the first transformer means of each of the translation systems shown in FIGS. 1, 2 and 3 may be omitted and a conductor substituted for said tertiary windings in the balance of the circuit connections of said translation systems. In the latter embodiment of the invention, the effect of the saturable reactors included in each translation system would be magnetically coupled through the associated second transformer means in series circuit relation with one of the windings of the associated first transformer means. It has been found in the latter embodiment of the invention, that the extent of the partial range control of the output voltage of the translation system as shown in FIG. 4 of the drawings is reduced. It is also to be understood that, although the voltage component provided by each of the second transformer means included in the translation systems shown in the different embodiments of the invention is preferably arranged to be aiding or additive with respect to the other associated voltage component, in certain applications, the voltage component across the second transformer means may be arranged to be opposing or bucking with respect to the other associated voltage component as previously disclosed. Furthermore, by the addition of conventional switching means to a translation system as disclosed, the voltage component across the second transformer means may be arranged to be either aiding or opposing with respect to the other associated voltage component to extend the partial range control of the output voltage of said translation system. Although the invention is illustrated with certain types of conventional double-way rectifier connections, it is to be understood that other types of conventional rectifier connections may be employed to interconnect the asymmetrically-conducting devices with the associated transformer means in a translation system as disclosed, particularly those of the double-way type. It is also clear that in polyphase translation systems as disclosed that different polyphase windings may be connected in delta rather than in Y as shown in FIGS. 2 and 3 provided that proper phase relationships are maintained between the different voltage components. Finally, it is to be understood that other types of conventional regulator systems may be substituted for the regulator system 30, particularly those of the static type including semiconductor devices, such as transistors, or those including different types of electronic tubes.

The apparatus embodying the teachings of this invention has several advantages. For example, in an electric power translation system including a plurality of asymmetrically-conducting devices of the general type, in which the conduction of said devices must be controlled by means which are completely external to said devices, the output voltage of said translation system may be controlled over a partial range in a continuous, stepless manner by varying the control signal or current applied to the saturable core reactors included in said translation system. In addition, the size, the equivalent kva. rating and the voltage rating of a saturable core reactor employed in a translation system as disclosed are considerably reduced compared to those of a saturable reactor employed in a conventional translation system which is connected in series circuit relation with either the primary winding or secondary winding of an associated rectifier transformer. Finally, it has been found that the power factor of a translation system, including a saturable reactor as disclosed, is much improved over a translation system including a saturable reactor connected in the conventional manner.

Since numerous changes may be made in the above described apparatus and circuits and different embodiments of the invention may be made without departing from the spirit and scope thereof, it is intended that all of the matter contained in the foregoing description or shown in the accompanying drawing shall be interpreted as illustrative and not in a limiting sense.

We claim as our invention:

1. An electrical control apparatus for varying the output voltage of an electric power translation system including a plurality of asymmetrically-conducting devices, comprising, alternating current power leads, direct-current power leads, first transformer means having a first winding connected to said alternating current leads and two additional windings disposed in inductive relation with said first winding, second transformer means having a primary winding and a secondary winding, said secondary winding being connected in series circuit relation with the first of said additional windings, said devices being connected between said direct-current leads and the series circuit which includes said first additional winding and said secondary winding, and saturable reactor means having input terminals and a load winding, said reactor load winding being connected in series circuit relation with the second of said additional windings, said primary winding being connected in series circuit relation with said reactor load winding and said second additional winding to carry all of the current in the load winding and the second additional winding and be directly responsive to the difference between the voltages across said second additional winding and said reactor load winding, the voltage across said saturable reactor load winding varying with a control signal applied to said input terminals to thereby vary the voltage across said secondary winding and the output voltage at said direct-current power leads.

2. An electric power translation system comprising, unidirectional current power leads, alternating current power leads, first transformer means including a first winding connected to said alternating current power leads and second and third windings disposed in inductive relation with said first winding, second transformer means having a primary winding connected in series circuit relation with said third winding and a secondary winding connected in series circuit relation with said second winding of said first transformer means, a plurality of asymmetrically-conducting devices connected between said unidirectional current power leads and the series circuit which includes said second and secondary windings to be responsive to the sum of the voltages across the latter windings, and saturable reactor means having a load winding serially connected between said third winding and said primary winding and a control winding, said primary winding carrying all of the current in said third winding and said load winding, the voltage across said load winding of said saturable reactor means and the average value of the voltage at said unidirectional current power leads varying with a control signal applied to said control winding.

3. An electric power translation system comprising, unidirectional current power leads, alternating current power leads, first transformer means including a first winding connected to said alternating current power leads and second and third windings disposed in inductive relation with said first winding, second transformer means having a primary winding connected in series circuit relation with said third winding and a secondary winding connected in series circuit relation with one of the other windings of said first transformer means, a plurality of asymmetrically-conducting devices connected between said unidirectional current power leads and said first and second transformer means to be responsive to the sum of the voltages across said secondary winding and said one of the other windings of said transformer means, and saturable reactor means having a load winding serially connected between said third winding and said primary winding and a control winding, said primary winding carrying all of the current in said third winding and said load winding, the voltage across said load winding of said saturable reactor means and the average value of the voltage at said unidirectional current power leads varying with a control signal applied to said control winding.

4. An electric power translation system comprising, unidirectional current power leads, alternating current power leads, first transformer means including a first winding connected to said alternating current power leads and second and third windings disposed in inductive relation with said first winding, second transformer means having a primary winding connected in series circuit relation with said third winding and a secondary winding connected in series circuit relation with said second winding of said first transformer means, a plurality of semiconductor diodes connected between said unidirectional current power leads and the series circuit which includes said second and secondary windings to be responsive to the sum of the voltages across the latter windings, and saturable reactor means having a load winding serially connected between said third winding and said primary winding and a control winding, said primary winding carrying all of the current in said third winding and said load winding, said primary winding carrying all of the current in said third winding and said load winding, the voltage across said load winding of said saturable reactor means and the average value of the voltage at said unidirectional current power leads varying with a control signal applied to said control winding.

5. An electrical control apparatus for varying the output voltage of an electric power translation system including a plurality of asymmetrically-conducting devices comprising, alternating current power leads, direct-current power leads, first transformer means having a first winding connected to said alternating current leads and two additional windings disposed in inductive relation with said first winding, second transformer means having a primary winding connected in series circuit relation with one of said additional windings and a secondary winding connected in series circuit relation with one of the other windings of said first transformer means, said devices being connected between said direct-current leads and said first and second transformer means to be responsive to the sum of the voltages across said secondary winding and said one of the other windings of said first transformer means, and saturable reactor means having input terminals and a load winding, said reactor load winding being connected in series circuit relation with said one of said additional windings, said primary winding being connected in series circuit relation with said reactor load winding and said one of said additional windings to carry all of the current in the load winding and the one additional winding and be directly responsive to the difference between the voltages across said one of said additional windings and said saturable reactor load winding, the voltage across said saturable reactor load winding varying with a control signal applied to said input terminals to thereby vary the voltage across said secondary winding and the output voltage at said direct-current power leads over a predetermined partial range.

6. An electrical control apparatus for varying the output voltage of an electric power translation system including a plurality of asymmetrically-conducting devices comprising, alternating current power leads, direct-current power leads, first transformer means having a first winding connected to said alternating current leads and two additional windings disposed in inductive relation with said first winding, second transformer means having a primary winding connected in series circuit relation with one of said additional windings and a secondary winding connected in series circuit relation with one of the other windings of said first transformer means, said devices being connected between said direct-current leads and said first and second transformer means to be responsive to the sum of the voltages across said secondary winding and said one of the other windings of said first transformer means, and saturable reactor means having input terminals and load windings, said reactor load windings being connected in series circuit relation with said one of said additional windings, said primary winding being connected in series circuit relation with said reactor load windings and said one of said additional windings to carry all of the current in said windings and be directly responsive to the difference between the voltages across said one of said additional windings and said saturable reactor load windings, the voltage across said saturable reactor load windings varying with a control signal applied to said input terminals to thereby vary the voltage across said secondary winding and the output voltage at said direct-current power leads over a predetermined partial range, the electric power ratings of said one of said additional windings and said saturable reactor means varying with the degree of the partial range over which the average value of the voltage at said unidirectional current power leads is controlled by said control signal applied at the input terminals of said saturable reactor means.

References Cited in the file of this patent
UNITED STATES PATENTS

| | | |
|---|---|---|
| 1,654,948 | Thompson | Jan. 3, 1928 |
| 1,996,041 | Emmerling | Mar. 26, 1935 |
| 2,349,685 | Trucksess | May 23, 1944 |
| 2,714,188 | Scherer | July 26, 1955 |
| 2,810,877 | Silver | Oct. 22, 1957 |
| 2,860,299 | Pomazal | Nov. 11, 1958 |
| 2,878,437 | Christie | Mar. 17, 1959 |
| 2,992,379 | Rosin | July 11, 1961 |